United States Patent
Okumura et al.

(10) Patent No.: US 10,539,927 B2
(45) Date of Patent: Jan. 21, 2020

(54) TIMEPIECE, ELECTRONIC DEVICE, AND CONTROL METHOD OF TIMEPIECE

(71) Applicant: Seiko Instruments Inc., Chiba-shi, Chiba (JP)

(72) Inventors: Akihito Okumura, Chiba (JP); Ryosuke Isogai, Chiba (JP); Kosuke Yamamoto, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 0 days.

(21) Appl. No.: 16/135,535

(22) Filed: Sep. 19, 2018

(65) Prior Publication Data

US 2019/0086873 A1 Mar. 21, 2019

(30) Foreign Application Priority Data

Sep. 21, 2017 (JP) ................. 2017-181685

(51) Int. Cl.
*G04C 3/14* (2006.01)
*G04C 10/00* (2006.01)
*H02P 8/02* (2006.01)

(52) U.S. Cl.
CPC ............. *G04C 3/143* (2013.01); *G04C 10/00* (2013.01); *H02P 8/02* (2013.01)

(58) Field of Classification Search
CPC ........................................................ H02P 8/02
USPC .................................................... 318/696, 34
See application file for complete search history.

(56) References Cited

U.S. PATENT DOCUMENTS 6,624,602 B2 * 9/2003 Ikegami .................. H02P 6/20
318/400.08

FOREIGN PATENT DOCUMENTS

JP    S55-033642 A    3/1980
JP    2014-117028 A    6/2014

* cited by examiner

*Primary Examiner* — David Luo
(74) *Attorney, Agent, or Firm* — Brinks Gilson & Lione

(57) ABSTRACT

A timepiece includes a voltage detection unit that detects a voltage applied to a stepping motor for driving an indicating hand, and that outputs a voltage detection result, and a drive control unit that controls a rotor to perform reverse rotation by using a reverse rotation pulse including a first pulse whose polarity is the same as that of a normal rotation pulse for causing the rotor of the stepping motor to perform normal rotation, a second pulse whose polarity is reverse to that of the first pulse, and a third pulse whose polarity is reverse to that of the second pulse, and to control the rotor to perform the reverse rotation by using the third pulse having a pulse width set in accordance with the voltage detection result.

11 Claims, 8 Drawing Sheets

| VOLTAGE RANGE | PULSE RANK | DEMAGNETIZATION PULSE ON-TIME G | OFF-TIME H | FIRST PULSE ON-TIME I | SECOND PULSE ON-TIME J | THIRD PULSE ||||| NUMBER OF VOLTAGE APPLICATION TIMES |
|---|---|---|---|---|---|---|---|---|---|---|
| | | | | | | ON-TIME K | OFF-TIME L | ON-TIME M | OFF-TIME N | |
| 2.4 V OR HIGHER AND LOWER THAN 3.6 V | HIGH RANK | 0.244ms | 5.127ms | 0.977ms | 2.197ms | 3.662ms | 0.488ms | 0.488ms | 0.488ms | 12 |
| 1.8 V OR HIGHER AND LOWER THAN 2.4 V | LOW RANK | 0.488ms | 5.371ms | 1.343ms | 2.197ms | 11.230ms | 0.488ms | 0.488ms | 0.488ms | 4 |

TIMEPIECE, ELECTRONIC DEVICE, AND CONTROL METHOD OF TIMEPIECE

RELATED APPLICATIONS

This application claims priority under 35 U.S.C. § 119 to Japanese Patent Application No. 2017-181685 filed on Sep. 21, 2017, the entire content of which is hereby incorporated by reference.

BACKGROUND OF THE INVENTION

1. Field of the Invention

The present invention relates to a timepiece, an electronic device, and a control method of a timepiece.

2. Description of the Related Art

In some cases, a motor unit for operating an indicating hand such as an hour hand, a minute hand, and a second hand may be mounted on a timepiece. The motor unit includes a stepping motor for rotating the indicating hand. A rotor of the stepping motor performs normal rotation or reverse rotation, if a pulse output from a drive control unit (driver IC) is applied to a coil.
When the rotor needs to be reversely rotated in the stepping motor including one coil in various stepping motors, the rotor is rotated once in a normal direction from the stationary position. Thereafter, the rotor is rotated in a reverse direction by utilizing a reactionary movement of the rotor which tends to return to a stationary position of the rotor (for example, refer to JP-A-55-33642 and JP-A-2014-117028). Therefore, during the reverse rotation, the rotor performs a more complicated operation, compared to an operation performed during the normal rotation. A pulse applied to the coil during the reverse rotation of the rotor (hereinafter, referred to as a "reverse rotation pulse") is more complicated, compared to a pulse applied to the coil during the normal rotation of the rotor.

SUMMARY OF THE INVENTION

Incidentally, the motor unit can be mounted on various types of the timepiece. In some cases, a power source included in the timepiece may vary depending on a type of the timepiece. If the type of the power source varies, there is a difference in voltages applied to the coils of the stepping motors. Therefore, the motor unit needs to correspond to various power sources included in the timepiece which is a mounting destination. That is, the stepping motor needs to use pulses of various voltages so that the rotor accurately performs the normal rotation and the reverse rotation. In particular, in a case of reverse rotation driving of the stepping motor, a more complicated pulse is applied to the coil, compared to normal rotation driving. Therefore, if the voltage having the pulse applied to the coil is changed, the rotor may be less likely to accurately perform the reverse rotation.

It is an aspect of the present application to provide a timepiece, an electronic device, and a control method of a timepiece, which are capable of ensuring rotation accuracy in reverse rotation of a rotor even if a voltage applied to a coil of a stepping motor is changed.

According to another aspect of the present application, there is provided a timepiece including a voltage detection unit that detects a voltage applied to a stepping motor for driving an indicating hand, and that outputs a voltage detection result, and a first control unit that controls a rotor to perform reverse rotation by using a reverse rotation pulse including a first pulse whose polarity is the same as that of a normal rotation pulse for causing the rotor of the stepping motor to perform normal rotation, a second pulse whose polarity is reverse to that of the first pulse, and a third pulse whose polarity is reverse to that of the second pulse, and that controls the rotor to perform the reverse rotation by using the third pulse having a pulse width set in accordance with the voltage detection result.

In the timepiece, preferably, the timepiece further includes a storage unit that stores a correspondence between a plurality of third pulse ranks relating to the pulse width of the third pulse and the voltage of the voltage detection result, and a second control unit that instructs the first control unit to cause the rotor to perform the reverse rotation by using the third pulse having the pulse width set based on the correspondence between the third pulse rank and the voltage of the voltage detection result, in accordance with the voltage detection result.

In the timepiece, preferably, the timepiece is formed so that two or more types of power sources having different voltage regions of an output voltage are mountable thereon. Preferably, the storage unit stores the correspondence between the third pulse rank including a voltage width wider than a variation width of the output voltage of each of the two or more types of power sources and the voltage of the voltage detection result.

In the timepiece, preferably, that the correspondence between the third pulse rank and the voltage of the voltage detection result is set so that the pulse width of the third pulse decreases as the voltage of the voltage detection result is higher.

In the timepiece, preferably, that the storage unit further stores the correspondence between a plurality of first pulse ranks relating to the pulse width of the first pulse and the voltage of the voltage detection result. Preferably, the second control unit instructs the first control unit to cause the rotor to perform the reverse rotation by using the third pulse having the pulse width set based on the correspondence between the first pulse rank and the voltage of the voltage detection result in accordance with voltage detection result, and the first pulse having the pulse width set in accordance with the voltage detection result.

In the timepiece, preferably, that the correspondence between the third pulse rank and the voltage of the voltage detection result is set so that the pulse width of the third pulse decreases as the voltage of the voltage detection result is higher. Preferably, the correspondence between the first pulse rank and the voltage of the voltage detection result is set so that the pulse width of the first pulse decreases as the voltage of the voltage detection result is higher.

In the timepiece, preferably, the third pulse includes a first half pulse which configures a first half of the third pulse, and a second half pulse which configures a second half of the third pulse and which is a chopping pulse whose duty ratio is lower than that of the first half pulse.

In the timepiece, preferably, the timepiece further includes a support body that has the first control unit. Preferably, the second control unit is disposed in a separate body from the support body.

In the timepiece, preferably, before the first pulse is applied to the stepping motor, the first control unit applies a demagnetization pulse whose polarity is the same as that of the first pulse, to the stepping motor.

According to another aspect of the present application, there is provided an electronic device configured to include the above-described timepiece.

According to still another aspect of the present application, there is provided a control method of a timepiece. The method includes causing a voltage detection unit to detect a voltage applied to a stepping motor for driving an indicating hand so as to output a voltage detection result, and causing a first control unit to control a rotor to perform reverse rotation by using a reverse rotation pulse including a first pulse whose polarity is the same as that of a normal rotation pulse for causing the rotor of the stepping motor to perform normal rotation, a second pulse whose polarity is reverse to that of the first pulse, and a third pulse whose polarity is reverse to that of the second pulse, and to control the rotor to perform the reverse rotation by using the third pulse having a pulse width set in accordance with the voltage detection result.

According to the present application, it is possible to provide a timepiece, an electronic device, and a control method of a timepiece, which are capable of ensuring rotation accuracy in reverse rotation of a rotor even if a voltage applied to a coil of a stepping motor is changed.

DETAILED DESCRIPTION OF THE PREFERRED EMBODIMENTS

Figure 1:
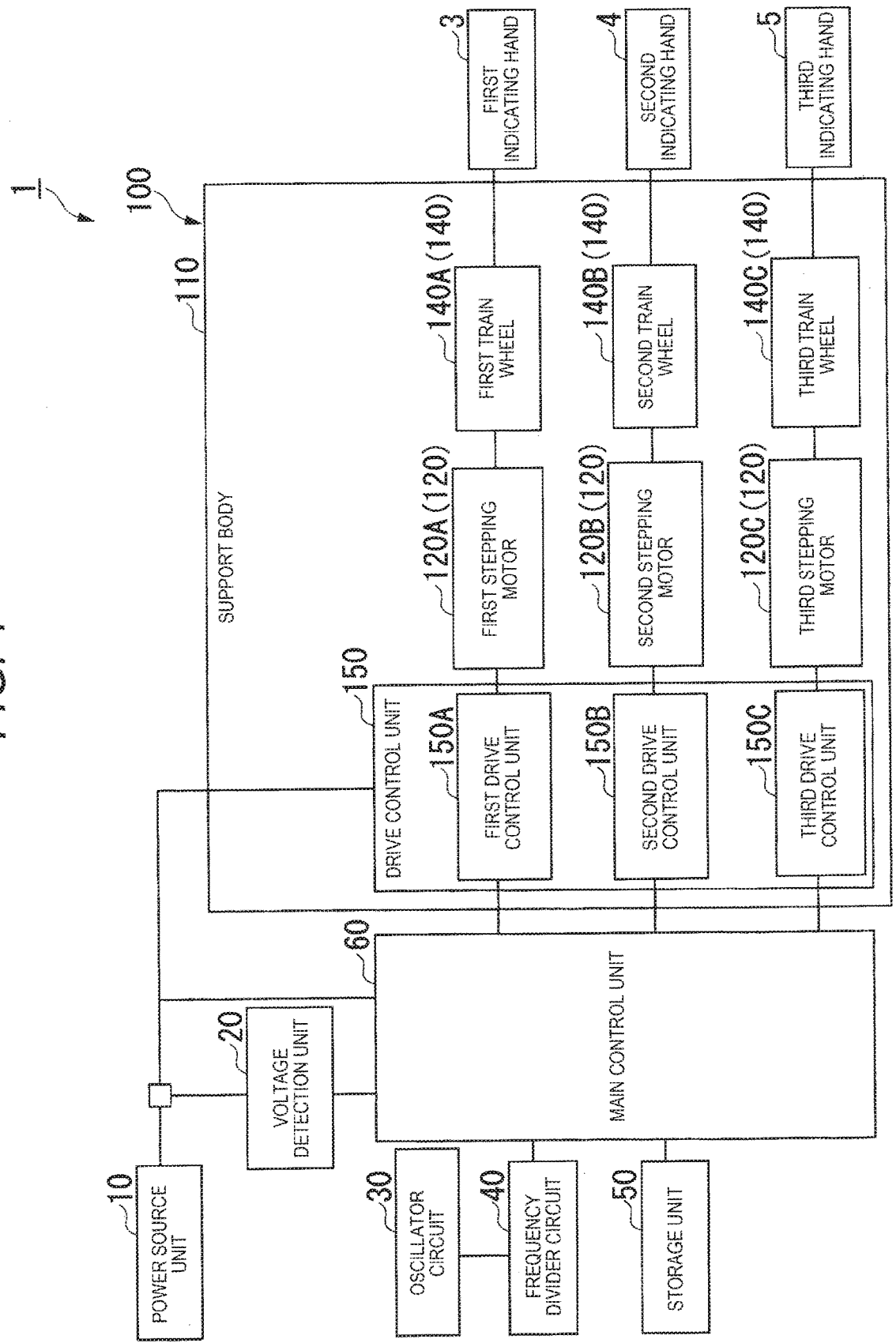
FIG. 1 is a block diagram illustrating a configuration example of a timepiece according to an embodiment.

Hereinafter, an embodiment according to the present invention will be described with reference to the drawings. In the following description, the same reference numerals will be given to configurations having the same or similar functions. In some cases, repeated description of the configurations may be omitted.

A timepiece 1 according to the present embodiment is an analog timepiece having an indicating hand or an electronic device (a smart watch and a wearable terminal). In the following embodiment, an example will be described in which the timepiece 1 is the electronic device such as the smart watch.

FIG. 1 is a block diagram illustrating a configuration example of the timepiece according to the embodiment.

As illustrated in FIG. 1, the timepiece 1 includes indicating hands 3 to 5, a power source unit 10, a voltage detection unit 20, an oscillator circuit 30, a frequency divider circuit 40, a storage unit 50, a main control unit 60 (second control unit), and a motor unit 100.

The indicating hand 3 to 5 are a first indicating hand 3, a second indicating hand 4, and a third indicating hand 5. The first indicating hand 3 is an hour hand, for example. The second indicating hand 4 is a minute hand, for example. The third indicating hand 5 is a second hand, for example. The indicating hands 3 to 5 are disposed so as to be rotatable with respect to the motor unit 100.

The power source unit 10 supplies power to the main control unit 60 and a drive control unit 150 (first control unit, to be described later) of the motor unit 100. For example, a power source such as a primary battery and a secondary battery is located in the power source unit 10. The secondary battery can employ a solar panel. In the present embodiment, the power source unit 10 of the timepiece 1 can correspond to two or more types of the power source. That is, the timepiece 1 is formed so that two or more types of power sources are mountable thereon. The respective power sources have different voltage regions of an output voltage (terminal voltage). For example, the primary battery and the secondary battery generally have the output voltages which respectively drop in response to each depth of discharge, and accordingly, both of these have different voltage region bands.

The voltage detection unit 20 detects the output voltage of the power source unit 10 (hereinafter, referred to as a power source voltage). The voltage detection unit 20 outputs a voltage detection result to the main control unit 60.

The oscillator circuit 30 realizes an oscillator by being combined with a crystal oscillator, and outputs a signal of a generated first frequency to the frequency divider circuit 40.

The frequency divider circuit 40 divides the signal of the first frequency output by the oscillator circuit 30 into a desired frequency, and outputs a frequency divided signal to the main control unit 60.

For example, the storage unit 50 is a nonvolatile storage medium such as a Random Access Memory (RAM) and a Read Only Memory (ROM). Data stored in the storage unit 50 will be described later.

The main control unit 60 controls each configuration element included in the timepiece 1. The main control unit 60 is operated at a timing of a signal using a drive frequency based on the first frequency. For example, the main control unit 60 is a central processing unit (CPU). The main control unit 60 causes a storage unit to store definitions of instruction signals for driving the motor unit 100. Based on the voltage detection result output by the voltage detection unit 20 and the data stored in the storage unit 50, the main control unit 60 outputs the instruction signals for driving the motor unit 100 to the drive control unit 150 of the motor unit 100.

The motor unit 100 includes a support body 110, a plurality of stepping motors 120A, 120B, and 120C, a plurality of train wheels 140A, 140B, and 140C, and the drive control unit 150.

The support body 110 forms an outer structure of the motor unit 100. The support body 110 supports each configuration element of the motor unit 100, such as the stepping motors 120A, 120B, and 120C, the train wheels 140A, 140B, and 140C, and the drive control unit 150. The support body 110 is configured to serve as a separate unit detachable from a timepiece main body, and a form of the support body 110 can be referred to as a so-called cassette type or a cartridge type. In this case, the motor unit 100 is handled as a semi-finished product and an intermediate product in a case where the timepiece main body is a finished product.

The support body 110 includes a main plate serving as a substrate or a base, a receiving plate for holding components arranged on the main plate from a side opposite to the main plate, other case units, and bearings to which rotation axles of the stepping motors 120A, 120B, and 120C are joined. The substrate is located on the main plate, and wires, an input unit, the drive control unit, the stepping motors 120A, 120B, and 120C, the train wheels 140A, 140B, and 140C are arranged on the substrate. These components are accommodated by the receiving plate so as to be assembled as a unit. An electrode serving as a connection terminal is located in the main plate, and this electrode fulfills a role of electrically connecting an electronic component in the motor unit 100 and an external portion (timepiece main body side) of the motor unit 100 to each other.

The plurality of stepping motors 120A, 120B, and 120C are the first stepping motor 120A for driving the first indicating hand 3, the second stepping motor 120B for driving the second indicating hand 4, and the third stepping motor 120C for driving the third indicating hand 5. In the following description, in a case where one of the first stepping motor 120A, the second stepping motor 120B, and the third stepping motor 120C is not specified, all of these are simply referred to as a stepping motor 120.

Figure 2:
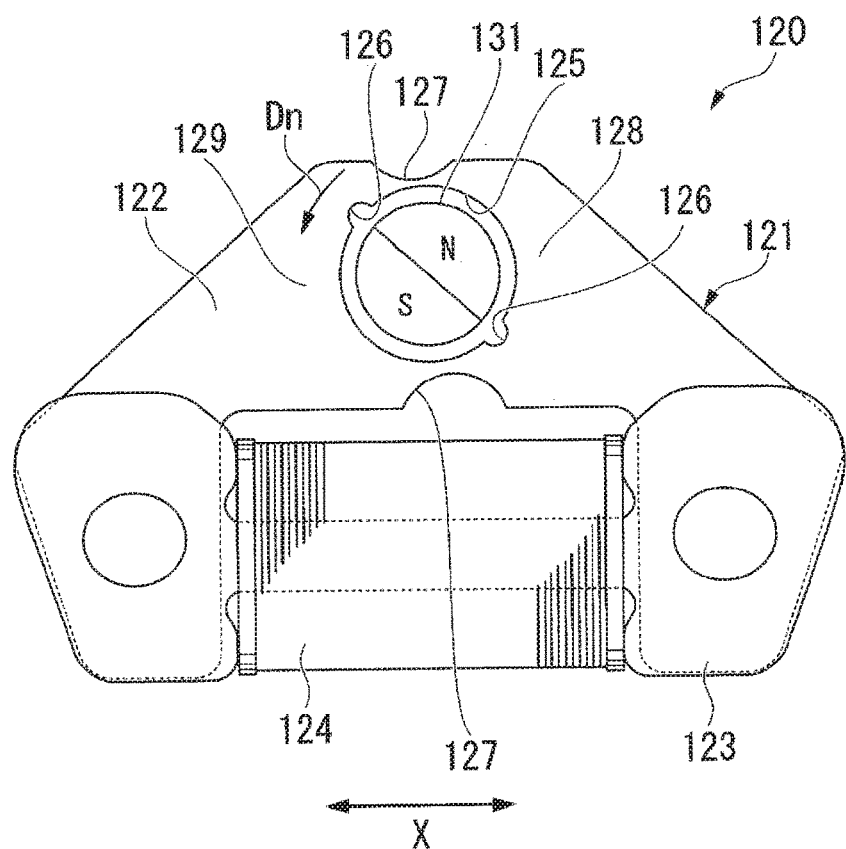
FIG. 2 is a plan view of a stepping motor.

FIG. 2 is a plan view of the stepping motor.

As illustrated in FIG. 2, the stepping motor 120 includes a stator 121 having a rotor accommodating hole 125, and a rotor 131 having a magnetic polarity by being magnetized into two poles in a radial direction and rotatably installed in the rotor accommodating hole 125.

The stator 121 includes a yoke 122 having the rotor accommodating hole 125 and a pair of outer cutout portions 127, a coil core 123 joined to the yoke 122, and a coil 124 wound around the coil core 123. The yoke 122 is formed of a plate material using a highly permeable magnetic material such as a permalloy. The yoke 122 has the rotor accommodating hole 125 in an intermediate portion, and extends to both sides in a predetermined direction X across the rotor accommodating hole 125.

The rotor accommodating hole 125 is formed in a circular hole shape. A pair of cutout portions 126 are formed on an inner peripheral surface of the rotor accommodating hole 125. The pair of cutout portions 126 are cut out in an arc shape. The pair of cutout portions 126 are formed at positions shifted as much as 180° from each other around a center of the rotor accommodating hole 125. The pair of cutout portions 126 are formed at positions shifted with respect to the predetermined direction X around the center of the rotor accommodating hole 125. In the present embodiment, the pair of cutout portions 126 are formed, for example, at positions shifted as much as approximately 135° in a normal rotation direction Dn of the rotor 131 with respect to the predetermined direction X, around the center of the rotor accommodating hole 125. The normal rotation direction Dn of the rotor 131 is a direction for rotating the indicating hands 3 to 5 around the timepiece. The pair of cutout portions 126 are configured to serve as a positioning portion for determining a stop position of the rotor 131.

The pair of outer cutout portions 127 are formed around the rotor accommodating hole 125 in the yoke 122. Specifically, the pair of outer cutout portions 127 are cut out from an outer edge of the yoke 122 toward the rotor accommodating hole 125 in a plan view. The pair of outer cutout portions 127 are cut out in an arc shape. The pair of outer cutout portions 127 are formed at positions shifted from each other as much as 180° around the center of the rotor accommodating hole 125. The pair of outer cutout portions 127 are formed at positions shifted as much as approximately 90° with respect to the predetermined direction X around the center of the rotor accommodating hole 125.

A periphery of the rotor accommodating hole 125 in the yoke 122 is locally narrowed by each of the outer cutout portions 127. In this manner, the narrowed portion of the yoke 122 is likely to be magnetically saturated. Since the magnetic saturation occurs, the periphery of the rotor accommodating hole 125 in the yoke 122 is magnetically divided into two portions. The yoke 122 has a first magnetic pole portion 128 disposed on one side in the predetermined direction X from the rotor accommodating hole 125, and a second magnetic pole portion 129 disposed on the other side in the predetermined direction X from the rotor accommodating hole 125.

For example, the coil core 123 is formed of a highly permeable magnetic material such as the permalloy. The coil core 123 is magnetically connected to both end portions of the yoke 122.

The coil 124 is wound around the coil core 123, and is magnetically coupled to the first magnetic pole portion 128 and the second magnetic pole portion 129 of the yoke 122.

If a magnetic flux is generated from the coil 124, the magnetic flux flows along the coil core 123 and the yoke 122 in the stator 121 configured as described above. The polarities of the first magnetic pole portion 128 and the second magnetic pole portion 129 are switched therebetween in accordance with an electrically connected state of the coil 124. The stator 121 generates a magnetic field extending along the predetermined direction X inside the rotor accommodating hole 125.

When a magnetic pole axis of the rotor 131 is located at a position orthogonal to a line segment connecting the pair of cutout portions 126 to each other, the rotor 131 has the lowest potential energy, and is stably stopped. Hereinafter, the position where the magnetic pole axis of the rotor 131 is located at the position orthogonal to the line segment connecting the pair of cutout portions 126 to each other and the rotor is stably stopped will be referred to as a stationary position. Specifically, the stationary position is a position where the magnetic pole axis of the rotor 131 is shifted, for example, as much as approximately 45° in the normal rotation direction Dn from the predetermined direction X.

As illustrated in FIG. 1, the plurality of train wheels 140A, 140B, and 140C are the first train wheel 140A for transmitting the power of the first stepping motor 120A to the first indicating hand 3, the second train wheel 140B for transmitting the power of the second stepping motor 120B to the second indicating hand 4, and the third train wheel 140C for transmitting the power of the third stepping motor 120C to the third indicating hand 5. The first train wheel 140A includes at least one gear, and is connected to the rotor 131 of the first stepping motor 120A. The second train wheel 140B includes at least one gear, and is connected to the rotor 131 of the second stepping motor 120B. The third train wheel 140C includes at least one gear, and is connected to the rotor 131 of the third stepping motor 120C.

For example, the drive control unit 150 is a motor driver integrated circuit (IC). The drive control unit 150 receives an instruction signal output by the main control unit 60. The drive control unit 150 determines a type of the instruction signal output by the main control unit 60. The drive control unit 150 generates a drive pulse for driving the stepping motor 120, based on a determination result of the instruction signal. The drive control unit 150 applies the generated drive pulse to the coil 124 of the stepping motor 120 so to cause the rotor 131 to perform one step of the normal rotation or one step of the reverse rotation. The drive control unit 150 does not include a regulator. Therefore, the voltage of the drive pulse varies depending on the voltage applied from the power source unit 10. The voltage detection unit 20 detects the power source voltage so as to indirectly detect the voltage applied to the stepping motor 120.

Next, the drive pulse output by the drive control unit 150 will be described in detail. In the following description, when the drive pulse is applied to the coil 124 of the stepping motor 120, the rotor 131 is stopped at the stationary position.

The drive pulse includes a normal rotation pulse for causing the rotor 131 to perform the normal rotation by every 180° at 1 Hz, a normal rotation fast forwarding pulse for causing the rotor 131 to perform the normal rotation by every 180°, for example, at 64 Hz, and a reverse rotation pulse for causing the rotor 131 to perform the reverse rotation by 180°, for example, at 32 Hz.

Figure 3:
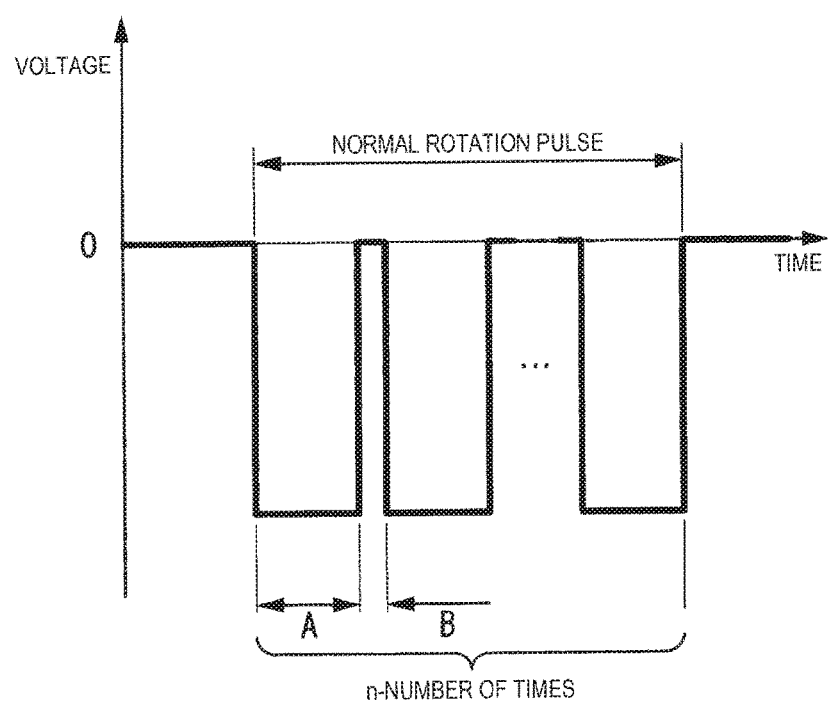
FIG. 3 is a view illustrating an example of a normal rotation pulse according to the embodiment.
Figure 4:
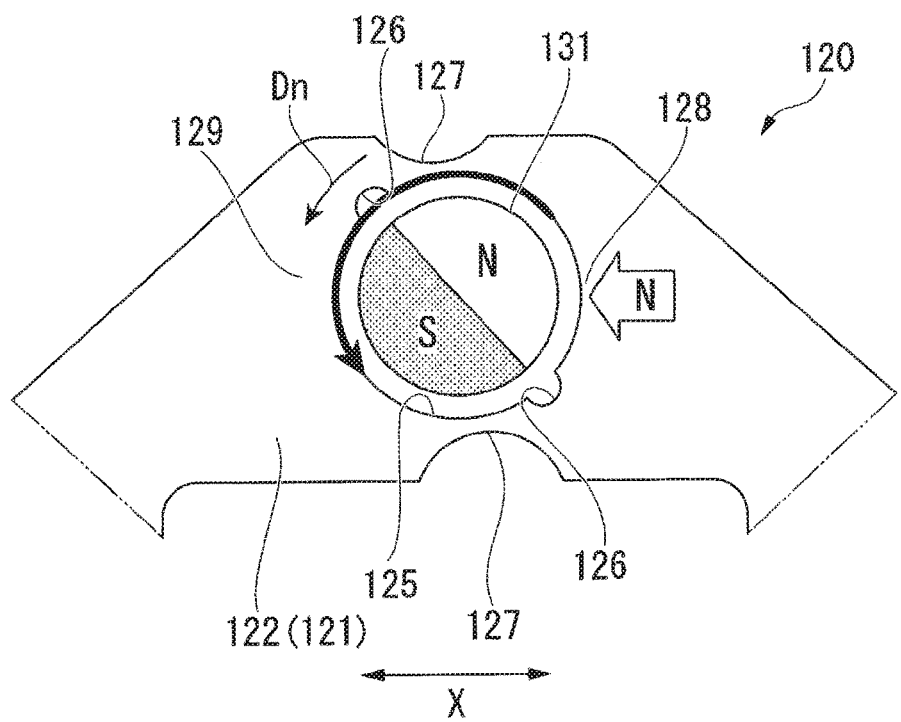
FIG. 4 is an operation diagram illustrating a normal rotation operation of the stepping motor according to the embodiment.

FIG. 3 is a view illustrating an example of the normal rotation pulse according to the embodiment. FIG. 4 is an operation diagram illustrating the normal rotation operation of the stepping motor according to the embodiment. In FIG. 3, a horizontal axis represents a time, and a vertical axis represents a voltage.

As illustrated in FIGS. 3 and 4, the normal rotation pulse is a chopping pulse. In the normal rotation pulse, voltage application at ON-time A and voltage blockade at OFF-time B are alternately repeated n-number of times. The normal rotation pulse excites the respective magnetic pole portions 128 and 129 facing the magnetic pole of the rotor 131 so as to have the polarity reverse to polarity of the rotor 131.

A plurality of ranks are set for the normal rotation pulse. The ranks of the normal rotation pulse relate to each size of a pulse width of the normal rotation pulse. The pulse width of the normal rotation pulse is a total value of ON-times of one normal rotation pulse applied when the rotor 131 is caused to perform one step of the normal rotation (this is similarly applicable to the pulse width of the other pulses described below). The pulse width of the normal rotation pulse is set in accordance with the voltage detection result. For example, a correspondence between the rank of the normal rotation pulse and the voltage of the voltage detection result is set so that the pulse width of the normal rotation pulse decreases as the voltage of the voltage detection result is higher. The correspondence between the rank of the normal rotation pulse and the voltage of the voltage detection result is stored as a table in the storage unit 50. The correspondence between the rank of the normal rotation pulse and the voltage of the voltage detection result includes a voltage width wider than a variation width of each output voltage of a plurality of power sources which can be mounted on the timepiece 1.

Figure 5:
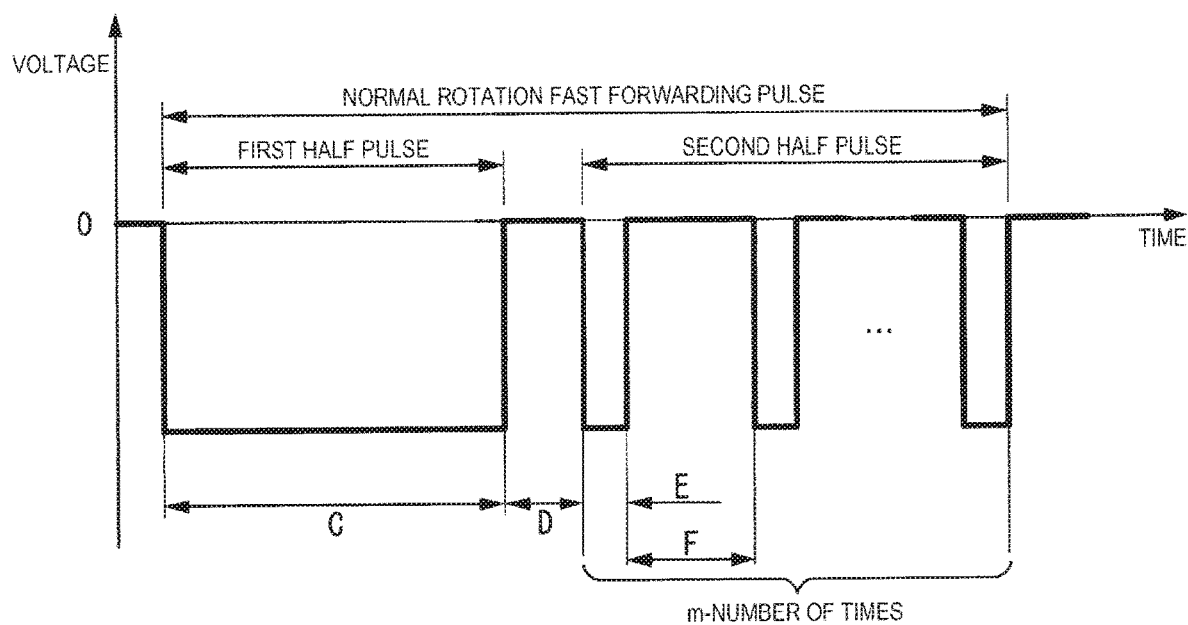
FIG. 5 is a view illustrating an example of a normal rotation fast forwarding pulse according to the embodiment.

FIG. 5 is a view illustrating an example of the normal rotation fast forwarding pulse according to the embodiment. In FIG. 5, the horizontal axis represents the time, and the vertical axis represents the voltage.

As illustrated in FIGS. 4 and 5, the normal rotation fast forwarding pulse includes a first half pulse configuring a first half of the normal rotation fast forwarding pulse and a second half pulse configuring a second half of the normal rotation fast forwarding pulse. The first half pulse is a rectangular pulse at ON-time C. A duty ratio of the first half pulse is 100%. The first half pulse excites the respective magnetic pole portions 128 and 129 facing the magnetic pole of the rotor 131 so as to have the polarity reverse to the polarity of the rotor 131. The first half pulse causes the rotor 131 to perform the normal rotation from the stationary position. For example, the first half pulse is applied until the rotor 131 passes a position where the magnetic pole axis of the rotor 131 is parallel to the line segment connecting the pair of cutout portions 126 to each other. After the first half pulse is applied, the second half pulse is applied at an interval of OFF-time D. The second half pulse has the polarity the same as that of the first half pulse, and is a chopping pulse whose duty ratio is lower than that of the first half pulse. In the second half pulse, voltage application at ON-time E and voltage blockade at OFF-time F are alternately repeated m-number of times.

A plurality of ranks are set for the normal rotation fast forwarding pulse. The ranks of the normal rotation fast forwarding pulse relate to each size of the pulse width of the first half pulse and the pulse width of the second half pulse of the normal rotation fast forwarding pulse. Hereinafter, in some cases, the pulse width of the first half pulse and the pulse width of the second half pulse of the normal rotation fast forwarding pulse are collectively referred to as the pulse width of the normal rotation fast forwarding pulse. The pulse width of the normal rotation fast forwarding pulse is set in accordance with the voltage detection result. For example, the correspondence between the rank of the normal rotation fast forwarding pulse and the voltage of the voltage detection result is set so that each pulse width of the first half pulse and the second half pulse of the normal rotation fast forwarding pulse decreases as the voltage of the voltage detection result is higher. Furthermore, the correspondence between the rank of the normal rotation fast forwarding pulse and the voltage of the voltage detection result is set so that all of the pulse widths of the normal rotation fast forwarding pulse decrease as the voltage of the voltage detection result is higher. The correspondence between the rank of the normal rotation fast forwarding pulse and the voltage of the voltage detection result is stored as a table in the storage unit 50. Similar to the correspondence between the rank of the normal rotation pulse and the voltage of the voltage detection result, the correspondence between the rank of the normal rotation fast forwarding pulse and the voltage of the voltage detection result includes the voltage width wider than the variation width of each output voltage of the plurality of power sources which can be mounted on the timepiece 1.

Figure 6:
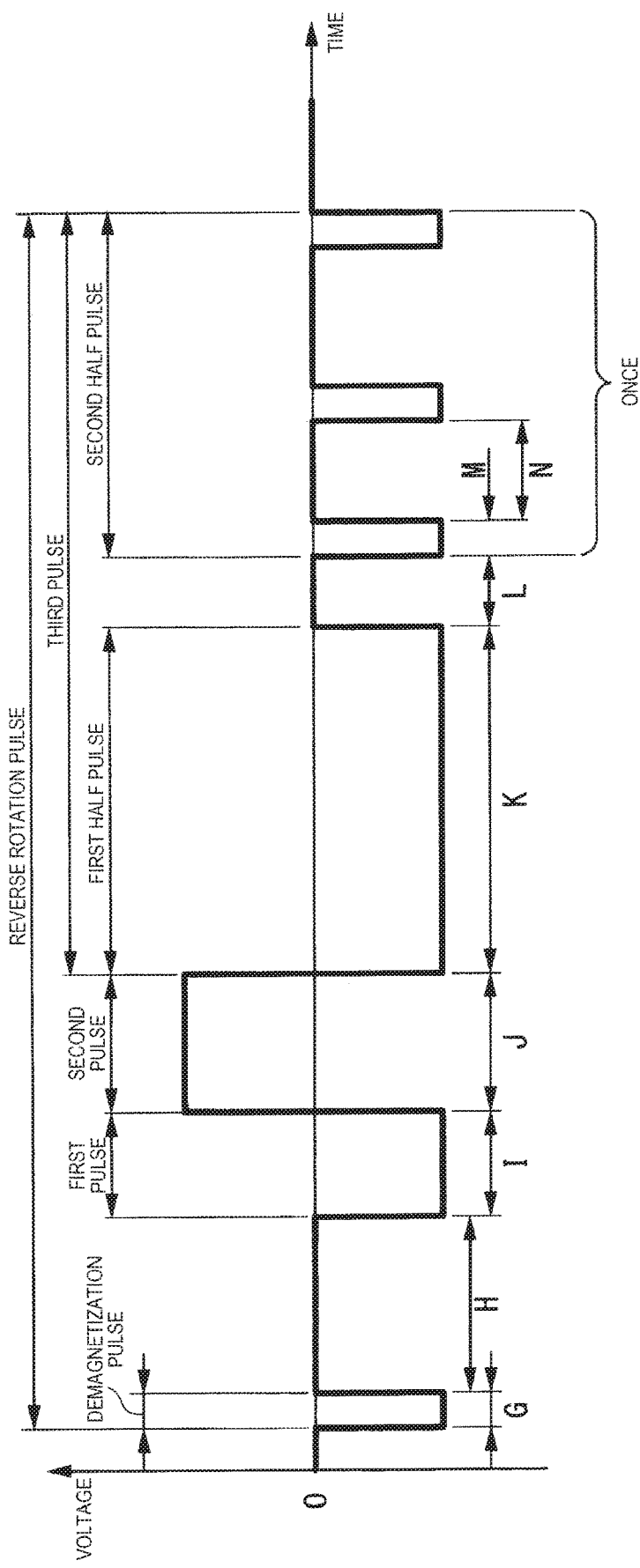
FIG. 6 is a view illustrating an example of a reverse rotation pulse according to the embodiment.

FIG. 6 is a view illustrating an example of the reverse rotation pulse according to the embodiment. FIGS. 7 to 10 are operation diagrams illustrating a reverse rotation operation of the stepping motor according to the embodiment. In FIG. 6, the horizontal axis represents the time, and the vertical axis represents the voltage.

As illustrated in FIG. 6, the reverse rotation pulse includes a demagnetization pulse whose polarity is the same as the polarity of the normal rotation pulse, a first pulse whose polarity is the same as the polarity of the normal rotation pulse, a second pulse whose polarity is reverse to the polarity of the first pulse, and a third pulse whose polarity is reverse to the polarity of the second pulse. The demagnetization pulse is a rectangular pulse at ON-time G. The demagnetization pulse demagnetizes a residual magnetic flux of the respective magnetic pole portions 128 and 129.

Figure 7:
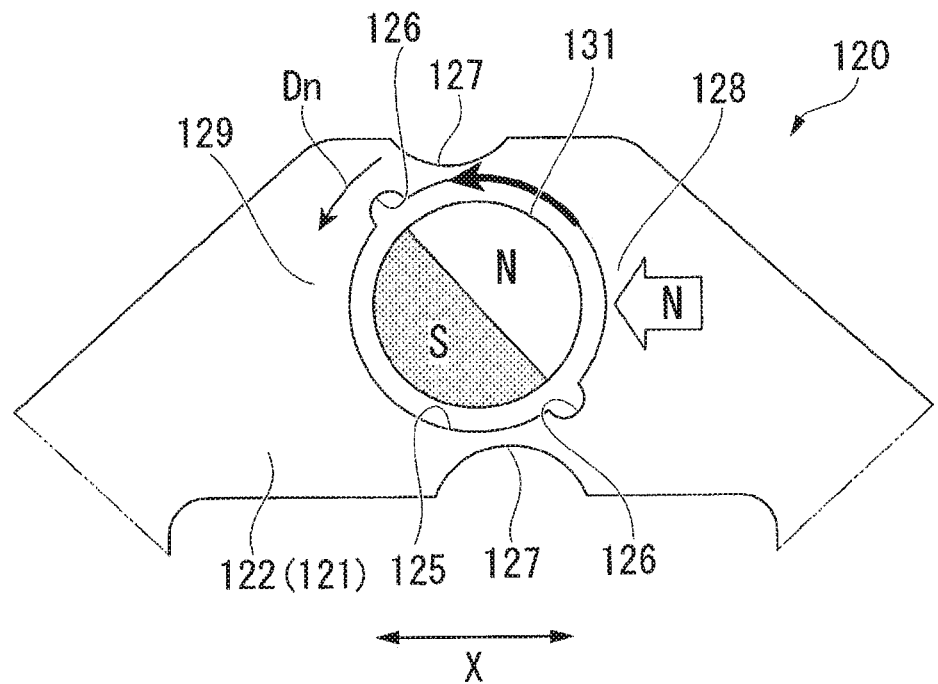
FIG. 7 is an operation diagram illustrating a reverse rotation operation of the stepping motor according to the embodiment.

As illustrated in FIGS. 6 and 7, after the demagnetization pulse is applied, the first pulse is applied at an interval of OFF-time H. The first pulse is a rectangular pulse at ON-time I. The first pulse excites the respective magnetic pole portions 128 and 129 facing the magnetic pole of the rotor 131 so as to have the polarity reverse to the polarity of the rotor 131. The first pulse causes the rotor 131 to perform the normal rotation from the stationary position. For example, the first pulse is applied immediately before the rotor 131 reaches a position where the magnetic pole axis of the rotor 131 is parallel to the line segment connecting the pair of outer cutout portions 127 to each other. Thereafter, after the first pulse is blocked, the rotor 131 performs the normal rotation by using the inertia until the second pulse effectively excites the respective magnetic pole portions 128 and 129. In this manner, due to a magnetic force generated by the first pulse and the inertia after the first pulse is blocked, the rotor 131 passes the position where the magnetic pole axis of the rotor 131 is parallel to the line segment connecting the pair of outer cutout portions 127 to each other. The rotor 131 performs the normal rotation until the rotor 131 does not pass a position where the magnetic pole axis of the rotor 131 is parallel to the line segment connecting the pair of cutout portions 126 to each other (for example, the position of the rotor 131 illustrated in FIG. 8).

Figure 8:
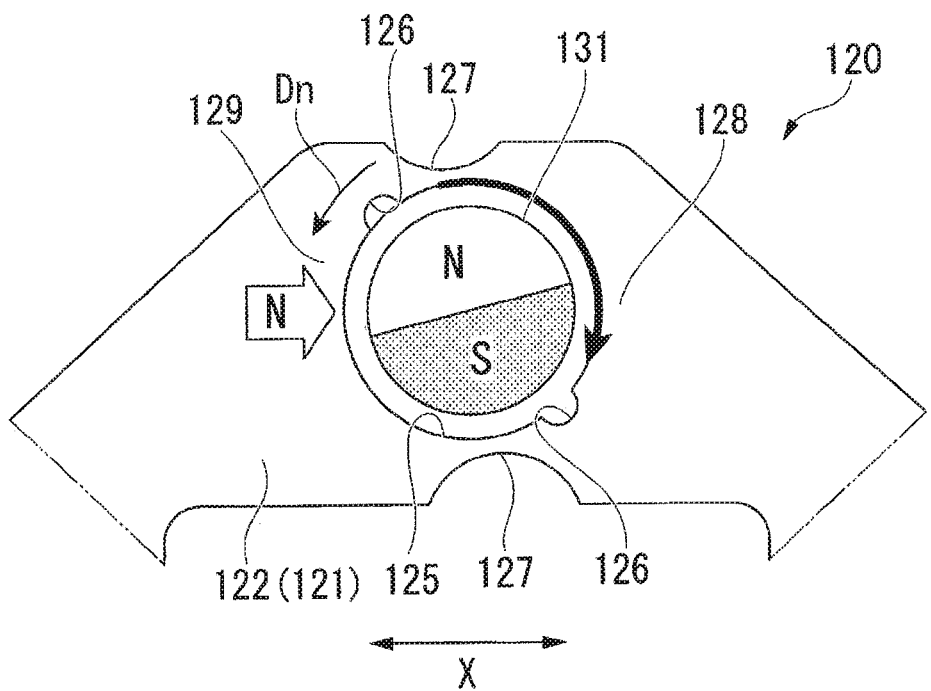
FIG. 8 is an operation diagram illustrating a reverse rotation operation of the stepping motor according to the embodiment.

As illustrated in FIGS. 6 and 8, the second pulse is continuously applied after the first pulse is applied. The second pulse is a rectangular pulse at ON-time J. The second pulse excites the respective magnetic pole portions 128 and 129 so as to have the polarity reverse to the polarity when the first pulse is applied. At the time of applying the second pulse, the rotor 131 is located at a position where the rotor 131 performs the normal rotation position from the stationary position. Therefore, at the time of applying the second pulse, a force which tends to return toward the stationary position acts on the rotor 131 in a direction of the reverse rotation. In this manner, the second pulse accelerates the reverse rotation of the rotor 131. The second pulse is applied until the rotor 131 reaches, for example, a position where the magnetic pole axis of the rotor 131 is parallel to the predetermined direction X. Thereafter, the rotor 131 performs the reverse rotation due to the inertia until the third pulse effectively excites the respective magnetic pole portions 128 and 129. In this manner, due to the force which tends to return toward the stationary position in the direction of the reverse rotation direction, the magnetic force generated by the second pulse, and the inertia after applying the second pulse is blocked, the rotor 131 performs the reverse rotation until the rotor 131 reaches, for example, a position beyond the position where the magnetic pole axis of the rotor 131 is parallel to the predetermined direction X (for example, the position of the rotor 131 illustrated in FIG. 9).

Setting these pulses is not limited to the relationship between the positions of the rotor as described above, as long as the setting can utilize the reverse movement caused by the first pulse and the reactional returning movement caused by the second pulse.

Figure 9:
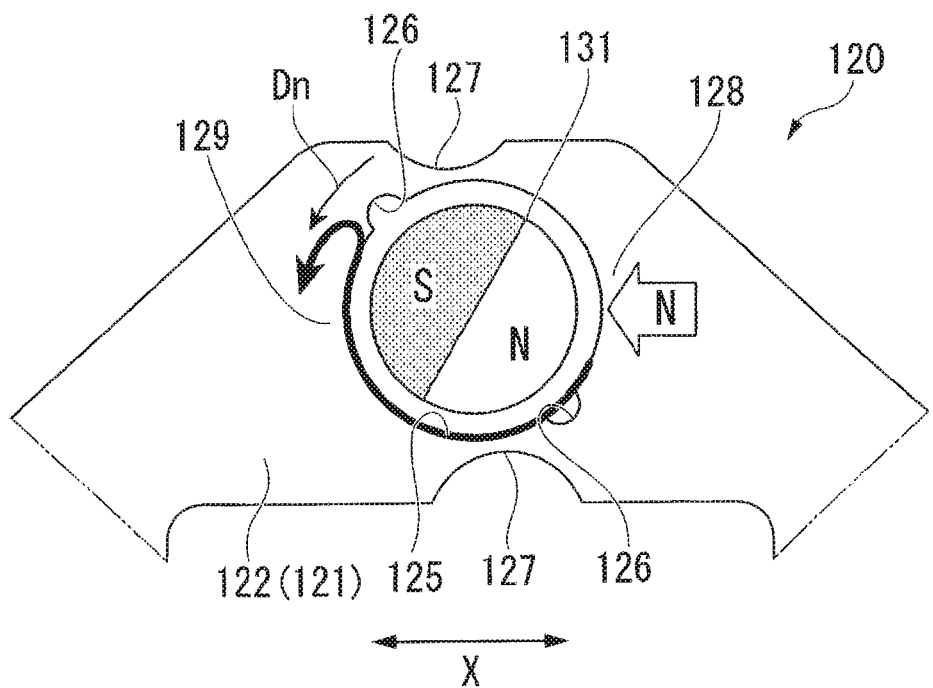
FIG. 9 is an operation diagram illustrating a reverse rotation operation of the stepping motor according to the embodiment.

As illustrated in FIGS. 6 and 9, the third pulse is continuously applied after the second pulse is applied. The third pulse includes the first half pulse and the second half pulse.

The first half pulse is a rectangular pulse at ON-time K. The duty ratio of the first half pulse is 100%. The first half pulse excites the respective magnetic pole portions 128 and 129 facing the magnetic pole of the rotor 131 so as to have the polarity reverse to the polarity of the rotor 131. Due to the first half pulse, the rotor 131 which is caused to perform the reverse rotation by the second pulse until the rotor 131 reaches a position beyond the position where the magnetic pole axis of the rotor 131 is parallel to the predetermined direction X is caused to further perform the reverse rotation. For example, the first half pulse is applied until the rotor 131 reaches a position beyond the position where the magnetic pole axis of the rotor 131 is parallel to the line segment connecting the pair of cutout portions 126 to each other.

Figure 10:
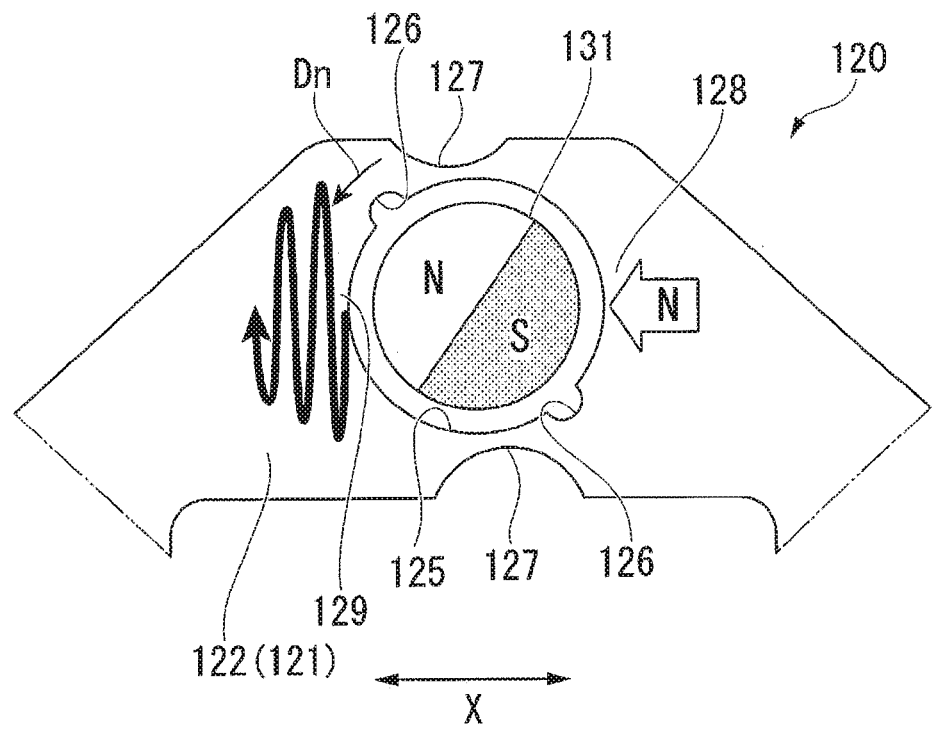
FIG. 10 is an operation diagram illustrating a reverse rotation operation of the stepping motor according to the embodiment.

The second half pulse has the polarity same as that of the first half pulse, and is a chopping pulse whose duty ratio is lower than the first half pulse. In the second half pulse, voltage application at ON-time M and voltage blockade at OFF-time N are alternately repeated once. After the first half pulse is applied, the second half pulse is applied at an interval of OFF-time L. Due to the second half pulse, the rotor 131 which performs the reverse rotation until the rotor 131 reaches a position beyond the position where the magnetic pole axis of the rotor 131 is parallel to the line segment connecting the pair of cutout portions 126 to each other is caused to perform the reverse rotation by using energy lower than that of the first half pulse. The second half pulse causes the rotor 131 to perform the reverse rotation until the rotor 131 reaches a position beyond the stationary position (refer to FIG. 10) and the rotation direction is switched to the normal rotation direction Dn. As illustrated in FIG. 10, after applying the second half pulse of the third pulse is stopped, vibrations of the rotor 131 are converged toward the stationary position by free vibration.

A plurality of ranks are set for the reverse rotation pulse. The ranks (a first pulse rank and a third pulse rank) of the reverse rotation pulse relate to each size of the pulse width of the first pulse, the pulse width of the second pulse, the pulse width of the first half pulse of the third pulse, and the pulse width of the second half pulse of the third pulse of the reverse rotation pulse. Hereinafter, in some cases, the pulse width of the first pulse, the pulse width of the second pulse, the pulse width of the first half pulse of the third pulse, and the pulse width of the second half pulse of the third pulse of the reverse rotation pulse are collectively referred to as the pulse width of the reverse rotation pulse. The pulse width of the reverse rotation pulse is set in accordance with the voltage detection result. The correspondence between the rank of the reverse rotation pulse and the voltage of the voltage detection result is stored as a table in the storage unit 50. Similar to the correspondence between the rank of the normal rotation pulse and the voltage of the voltage detection result, the correspondence between the rank of the reverse rotation pulse and the voltage of the voltage detection result includes the voltage width wider than the variation width of each output voltage of the plurality of power sources which can be mounted on the timepiece 1. For example, on the assumption that an initial voltage of a lithium ion secondary battery is 3.6 V and a final voltage of a primary battery is 1.8 V, the above-described correspondence is set so as to include the voltage width of 1.8 V to 3.6 V.

Figures 11, 12:
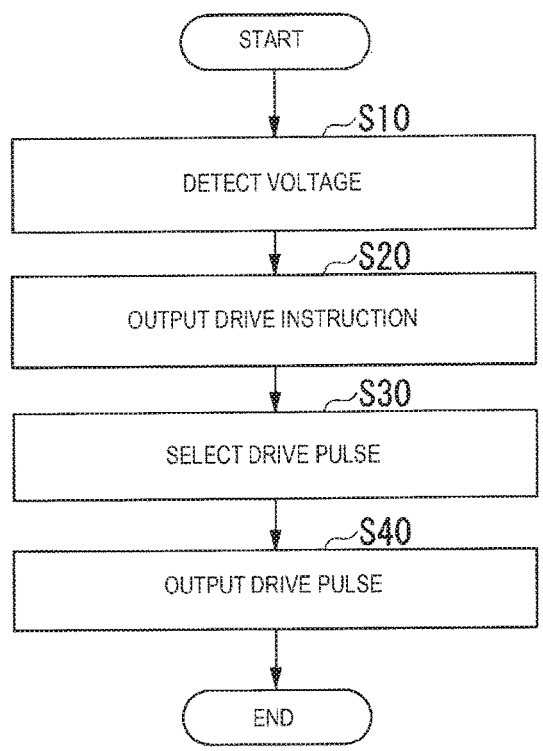
FIG. 11 is a table illustrating an example of a relationship among a voltage of a voltage detection result, a rank of the reverse rotation pulse, and a pulse width of the reverse rotation pulse.
FIG. 12 is a process flowchart of the timepiece according to the embodiment.

FIG. 11 is a table illustrating an example of a relationship among the voltage of the voltage detection result, the rank of the reverse rotation pulse, and the pulse width of the reverse rotation pulse.

As illustrated in FIG. 11, according to the present embodiment, two ranks of a high rank and a low rank are set for the ranks of the reverse rotation pulse. In a case where the voltage of the voltage detection result is 2.4 V or higher and lower than 3.6 V, the rank of the reverse rotation pulse is set to the high rank. In contrast, in a case where the voltage of the voltage detection result is 1.8 V or higher and lower than 2.4 V, the rank of the reverse rotation pulse is set to the low rank. In the reverse rotation pulse of the high rank, ON-time G of the demagnetization pulse is set to 0.244 ms. In the reverse rotation pulse of the low rank, ON-time G of the demagnetization pulse is set to 0.488 ms. That is, the pulse width of the demagnetization pulse of the reverse rotation pulse is set so as to decrease as the voltage of the voltage detection result is higher.

This demagnetization pulse is set to the polarity the same as that of the first pulse. In this manner, it is possible to ensure responsiveness when the rotor starts to be rotated by receiving the first pulse. Therefore, the reverse rotation can be more accurately driven.

In the reverse rotation pulse of the high rank, ON-time I of the first pulse is set to 0.977 ms. In the reverse rotation pulse of the low rank, ON-time I of the first pulse is set to 1.343 ms. That is, the correspondence between the rank of the reverse rotation pulse and the voltage of the voltage detection result is set so that the pulse width of the first pulse of the reverse rotation pulse decreases as the voltage of the voltage detection result is higher. OFF-time H between the demagnetization pulse and the first pulse is set to 5.127 ms in a case of the high rank, and is set to 5.371 ms in a case of the low rank. ON-time J of the second pulse of the reverse rotation pulse is set to 2.197 ms, regardless of the rank of the reverse rotation pulse.

In the reverse rotation pulse of the high rank, ON-time K of the first half pulse of the third pulse is set to 3.662 ms. In the reverse rotation pulse of the low rank, ON-time K of the first half pulse of the third pulse is set to 11.230 ms. That is, the correspondence between the rank of the reverse rotation pulse and the voltage of the voltage detection result is set so that the pulse width of the first half pulse of the third pulse of the reverse rotation pulse decreases as the voltage of the voltage detection result is higher.

In the reverse rotation pulse of the high rank, ON-time M of the second half pulse of the third pulse is set to 0.488 ms, OFF-time N is set to 0.488 ms, and the number of voltage application times 1 is set to 12 times. In the reverse rotation pulse of the low rank, ON-time M of the second half pulse of the third pulse is set to 0.488 ms, OFF-time N is set to 0.488 ms, and the number of voltage application times 1 is set to 4 times. That is, the correspondence between the rank of the reverse rotation pulse and the voltage of the voltage detection result is set so that the pulse width of the second half pulse of the third pulse of the reverse rotation pulse increases as the voltage of the voltage detection result is higher. Furthermore, the correspondence between the rank of the reverse rotation pulse and the voltage of the voltage detection result is set so that the pulse width of all of the third pulses of the reverse rotation pulse decreases as the voltage of the voltage detection result is higher. OFF-time L between the first half pulse and the second half pulse is set to 0.488 ms, regardless of the rank of the reverse rotation pulse.

Next, a control method of the timepiece 1 will be described.

FIG. 12 is a process flowchart of the timepiece according to the embodiment. The following process flow is performed at every regular time interval.

As illustrated in FIG. 12, in a case where the stepping motor 120 is driven one step, a voltage detection step S10 is first performed. In the voltage detection step S10, the main control unit 60 acquires the voltage detection result output by the voltage detection unit 20.

Subsequently, a process in a drive instruction output step S20 is performed. In the drive instruction output step S20, the main control unit 60 outputs an instruction signal for driving the motor unit 100 to the drive control unit 150. The instruction signal is defined in accordance with a type of driving the motor unit 100 (normal rotation drive, normal rotation fast forwarding drive, or reverse rotation drive), and the rank of the pulse. The main control unit 60 refers to the correspondence between the rank of each pulse stored in the storage unit 50 and the voltage of the voltage detection result, and outputs the instruction signal corresponding to the rank of the pulse based on the voltage detection result.

Subsequently, a process in a drive pulse selection step S30 is performed. In the drive pulse selection step S30, the drive control unit 150 discriminates a type of the instruction signal output by the main control unit 60, and generates a drive pulse based on the instruction signal.

Subsequently, a process in a drive pulse output step S40 (reverse rotation step) is performed. The drive control unit 150 outputs the drive pulse generated in the drive pulse selection step S30, and applies the drive pulse to the coil 124 of the stepping motor 120. In this manner, the drive control unit 150 rotates the rotor 131 by using the normal rotation pulse, the normal rotation fast forwarding pulse, or the reverse rotation pulse having the pulse width set in accordance with the voltage detection result.

Hereinafter, an operation according to the present embodiment will be described.

Figure 13:
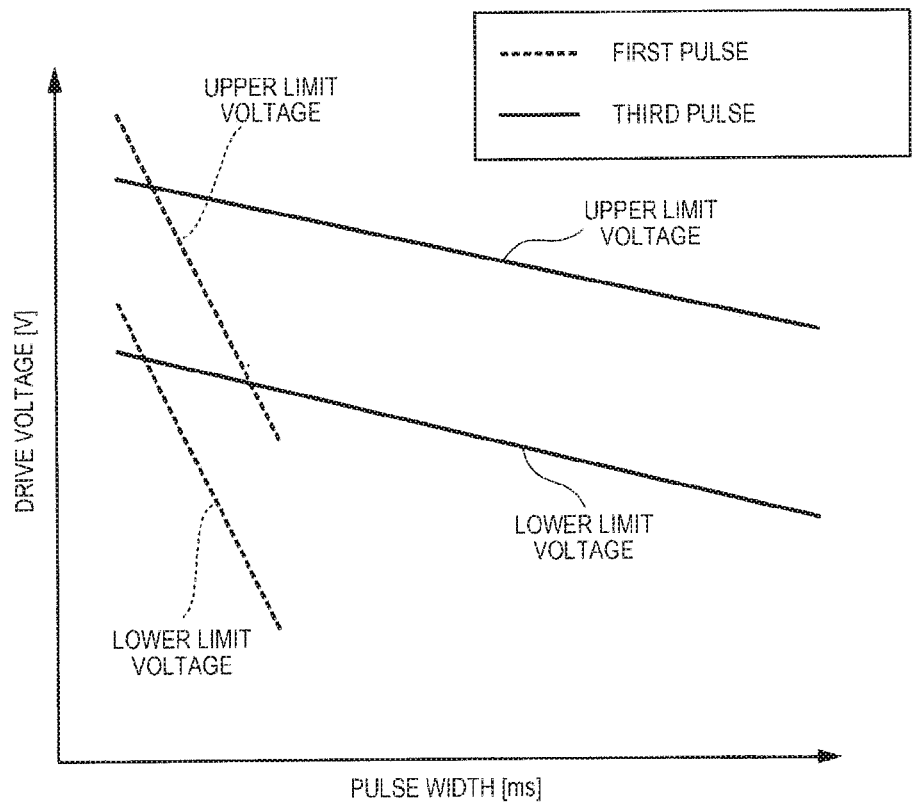
FIG. 13 is a view illustrating a relationship between each pulse width of a first pulse and a third pulse of the reverse rotation pulse and a voltage range in which the stepping motor can be driven.

FIG. 13 is a view illustrating a relationship between each pulse width of the first pulse and the third pulse of the reverse rotation pulse and the voltage range in which the stepping motor can be driven. In FIG. 13, the horizontal axis represents the pulse width, and the vertical axis represents the voltage (drive voltage) applied to the coil 124 of the stepping motor 120.

As illustrated in FIG. 13, each of the first pulse and the third pulse of the reverse rotation pulse has a voltage range which can accurately rotate the rotor 131. The voltage range which can accurately rotate the rotor 131 is determined by each pulse width of the first pulse and the third pulse of the reverse rotation pulse. In a case where the voltage of the first pulse or the third pulse of the reverse rotation pulse deviates from the voltage range illustrated in FIG. 13, the rotor 131 cannot perform one step of the reverse rotation, and the step-out of the stepping motor 120 occurs.

Here, the step-out of the stepping motor 120 when the reverse rotation is driven will be described in detail.

When the first pulse of the reverse rotation pulse is applied to the coil 124, if the first pulse having the voltage exceeding an upper limit of the voltage range relating to the first pulse is applied to the coil 124, the rotor 131 performs the normal rotation until the rotor 131 reaches a position beyond the position where the magnetic pole axis of the rotor 131 is parallel to the line segment connecting the pair of cutout portions 126 to each other. In this manner, when the second pulse is applied to the coil 124, there is a possibility that the rotor 131 cannot perform the reverse rotation until the rotor 131 reaches a desired position. When the first pulse of the reverse rotation pulse is applied to the coil 124, if the first pulse having the voltage lower than a lower limit of the voltage range relating to the first pulse is applied to the coil 124, the amount of the normal rotation of the rotor 131 by using the first pulse is insufficient. In this manner, the force of the rotor 131 which tends to return to the stationary position is insufficient. Consequently, when the second pulse is applied to the coil 124, there is a possibility that the rotor 131 may not perform the reverse rotation until the rotor 131 reaches the desired position. In this way, when the reverse rotation pulse is applied to the coil 124, in a case where the first pulse cannot be applied using the voltage within the voltage range determined by the pulse width of the first pulse, there is a possibility that the step-out of the stepping motor 120 may occur.

When the third pulse of the reverse rotation pulse is applied to the coil 124, if the third pulse having the voltage exceeding the upper limit of the voltage range relating to the third pulse is applied to the coil 124, the rotor 131 performs the reverse rotation until the rotor 131 passes the stationary position and further reaches a position beyond the position where the magnetic pole axis of the rotor 131 is parallel to the line segment connecting the pair of cutout portions 126 to each other. In this manner, when the third pulse is applied to the coil 124, there is a possibility that the rotor 131 may perform two steps (360°) of the reverse rotation. When the third pulse of the reverse rotation pulse is applied to the coil 124, if the voltage lower than the lower limit of the voltage range relating to the third pulse is applied to the coil 124, the rotor 131 has insufficient energy for moving between the magnetic pole portions 128 and 129. Accordingly, the rotor 131 cannot perform the reverse rotation until the rotor 131 reaches a position beyond the position where the magnetic pole axis of the rotor 131 is parallel to the line segment connecting the pair of cutout portions 126 to each other. In this way, when the reverse rotation pulse is applied to the coil 124, in a case where the third pulse cannot be applied using the voltage within the voltage range determined by the pulse width of the third pulse, there is a possibility that the step-out of the stepping motor 120 may occur.

According to the present embodiment, the drive control unit 150 controls the rotor 131 to perform the reverse rotation by using the third pulse having the pulse width set in accordance with the voltage detection result. In this manner, without detecting the rotation position of the rotor 131, it is possible to suppress the step-out of the stepping motor 120 which is caused by the third pulse, and the rotor 131 can accurately perform the reverse rotation by using various voltages. Therefore, even if the voltage applied to the coil 124 of the stepping motor 120 is changed, the rotation accuracy of the reverse rotation of the rotor 131 can be ensured.

The timepiece 1 includes the storage unit 50 which stores the correspondence between the plurality of ranks relating to the pulse width of the third pulse and the voltage detection result, and the main control unit 60 which instructs the drive control unit 150 to cause the rotor 131 to perform the reverse rotation by using the third pulse having the pulse width set based on the correspondence between the rank of the reverse rotation pulse and the voltage of the voltage detection result in accordance with the voltage detection result. In this manner, without requiring an instruction from an external device, the timepiece 1 can spontaneously cause the rotor 131 to exactly perform the reverse rotation in accordance with the voltage detection result.

The timepiece 1 is formed so that two or more types of power sources having the different voltage regions of the output voltage are mountable thereon. The storage unit 50 stores the correspondence between the pulse width of the third pulse including the voltage width wider than the variation width of each output voltage of the two or more types of the power sources and the voltage of the voltage detection result. In this manner, even in a case where the voltage range applied to the coil 124 of the stepping motor 120 is widened compared to a case where only the timepiece 1 having one type of the power source mounted thereon is driven, the rotor 131 can exactly perform the reverse rotation by using the correspondence between the pulse width of the third pulse stored in the storage unit 50 and the voltage of the voltage detection result.

The correspondence between the rank of the reverse rotation pulse and the voltage of the voltage detection result is set so that the pulse width of the third pulse decreases as the voltage of the voltage detection result is higher. Therefore, it is possible to suppress a tendency in which the energy supplied to the stepping motor 120 increase as the voltage of the voltage detection result is higher. In this manner, suppressing the step-out of the stepping motor 120 which occurs due to excessive energy generated by the third pulse having the high voltage and suppressing the step-out of the stepping motor 120 which occurs due to insufficient energy generated by the third pulse having the low voltage can be compatibly achieved. Therefore, the rotor 131 can accurately perform the reverse rotation.

In accordance with the voltage detection result, the main control unit 60 instructs the drive control unit 150 to cause the rotor 131 to perform the reverse rotation by using the first pulse having the pulse width set based on the correspondence between the rank of the reverse rotation pulse and the voltage of the voltage detection result. In this manner, in addition to suppressing the step-out of the stepping motor 120 which is caused by the third pulse, the step-out of the stepping motor 120 which is caused by the first pulse is suppressed. The rotor 131 can accurately perform the reverse rotation by using various voltages. Therefore, even if the voltage applied to the coil 124 of the stepping motor 120 is changed, the rotation accuracy of the reverse rotation of the rotor 131 can be ensured.

The correspondence between the rank of the reverse rotation pulse and the voltage of the voltage detection result is set so that the pulse width of the first pulse decreases as the voltage of the voltage detection result is higher. Therefore, it is possible to suppress a tendency in which the energy supplied to the stepping motor 120 increase as the voltage of the voltage detection result is higher. In this manner, suppressing the step-out of the stepping motor 120 which occurs due to excessive energy generated by the first pulse having the high voltage and suppressing the step-out of the stepping motor 120 which occurs due to insufficient energy generated by the first pulse having the low voltage can be compatibly achieved. Therefore, the rotor 131 can accurately perform the reverse rotation.

The third pulse of the reverse rotation pulse includes the second half pulse which configures the second half of the third pulse and which is the chopping pulse having the duty ratio lower than the first half pulse. In this manner, compared to a case where the whole third pulse is a rectangular pulse having the duty ratio of 100%, it is possible to reduce the rotation speed of the rotor 131 in the second half when the third pulse is applied. Therefore, it is possible to suppress the step-out of the stepping motor 120 which occurs due to excessive energy generated by the third pulse having the high voltage.

The first half pulse of the third pulse of the reverse rotation pulse is a rectangular pulse having the duty ratio of 100%. Therefore, compared to a case where the whole third pulse of the reverse rotation pulse is the chopping pulse, the energy supplied to the rotor 131 can be increased. In this manner, it is possible to suppress the step-out of the stepping motor 120 which occurs due to insufficient energy generated by the third pulse having the low voltage. Therefore, even in a case where the second half pulse of the third pulse of the reverse rotation pulse is the chopping pulse, the rotor 131 can exactly perform the reverse rotation.

If applying the second half pulse of the third pulse is stopped in a state where the rotor 131 is rotated using the third pulse rotating in the direction of the reverse rotation direction, the rotor 131 passes the stationary position, and performs the reverse rotation due to the inertia until the rotor 131 reaches the position where the magnetic pole axis of the rotor 131 passes the line segment connecting the pair of cutout portions 126 to each other, thereby causing a possibility of the step-out. According to the present embodiment, when the reverse rotation pulse is applied to the coil 124, the drive control unit 150 applies the second half pulse of the third pulse until the rotor 131 performs the reverse rotation to a position beyond the stationary position and the rotation direction of the rotor 131 is switched to the normal rotation direction Dn. In this manner, it is possible to suppress a possibility that the rotor 131 may perform the reverse rotation due to the inertia until the rotor 131 reaches the position where the magnetic pole axis of the rotor 131 passes the line segment connecting the pair of cutout portions 126 to each other. The rotor 131 can be moved toward the stationary position. Therefore, the rotor 131 can accurately perform the reverse rotation.

The timepiece 1 includes the support body 110 having the drive control unit 150, and the main control unit 60 is disposed in a separate body (for example, the main plate of the timepiece 1) from the support body 110. In this manner, it is possible to configure the motor unit 100 including the support body 110 as a separate body from the timepiece main body having the main control unit 60. Accordingly, in a case where the motor unit 100 serving as an intermediate product is mounted on the timepiece main body serving as a finished product, regardless of the type of the power source included in the timepiece main body serving as a mounting destination of the motor unit 100, the stepping motor 120 of the motor unit 100 can be driven to perform the reverse rotation. Therefore, the configuration and the control method according to the present embodiment are suitable for the timepiece 1 on which the motor unit 100 including the support body 110 is mounted.

The present invention is not limited to the embodiment described above with reference to the drawings, and various modification examples are conceivable within the technical scope of the present invention.

For example, in the above-described embodiment, the power source unit 10 which can correspond to two or more types of the power sources is mounted on the timepiece 1. However, the present invention is not limited thereto. According to the configuration and the control method of the above-described embodiment, the reverse rotation of the stepping motor can be driven using various power source voltages. Therefore, for example, the power source unit which can correspond to only one type of the power sources may be mounted on the timepiece 1.

In the above-described embodiment, the voltage detection unit 20 and the storage unit 50 are disposed outside the motor unit 100. However, the present invention is not limited thereto. For example, the voltage detection unit and the storage unit may be disposed in the support body of the motor unit. In this case, for example, a configuration may be adopted in which the main control unit indicates a driving type to the drive control unit and the drive control unit determines the rank of each pulse, based on the voltage detection result. According to this configuration, in addition to the operation effect achieved by the above-described embodiment, it is possible to further achieve an advantageous effect in that the processes performed by the main control unit disposed in the timepiece main body can be simplified. Therefore, the present invention is more effectively applicable to a case where the motor unit serving as the intermediate product is mounted on in the timepiece main body serving as the finished product.

In the above-described embodiment, the drive control unit 150 outputs the drive pulse. However, the present invention is not limited thereto. For example, a configuration may be adopted in which the main control unit has a function as the drive control unit 150 in the above-described embodiment and the main control unit outputs the drive pulse.

In the above-described embodiment, the voltage detection unit 20 indirectly detects the voltage applied to the stepping motor 120 by detecting the power source voltage. However, the present invention is not limited thereto. The voltage detection unit may be capable of directly detecting the voltage applied to the stepping motor 120.

In the above-described embodiment, the first half pulse of the third pulse of the reverse rotation pulse is the rectangular pulse having the duty ratio of 100%. However, the present invention is not limited thereto. The first half pulse of the third pulse of the reverse rotation pulse may be the chopping pulse. Even in this case, the duty ratio of the first half pulse is set to be higher than the duty ratio of the second half pulse. In this manner, the above-described operation effect can be achieved.

In the above-described embodiment, two ranks of the high rank and the low rank are set as the rank of each pulse. However, three or more ranks may be set.

In the above-described embodiment, the main control unit 60 determines the rank of each pulse, based on the correspondence between the rank of each pulse stored in the storage unit 50 and the voltage of the voltage detection result. However, the present invention is not limited thereto. For example, the main control unit may calculate the rank of each pulse, based on a predetermined expression obtained from the voltage of the voltage detection result.

In the above-described embodiment, the ranks of the first pulse, the second pulse, and the third pulse in the reverse rotation pulse are collectively set as the ranks of the reverse rotation pulse. However, the present invention is not limited thereto. For example, the rank of the first pulse, the rank of the second pulse, and the rank of the third pulse may be independently set.

In the above-described embodiment, the timepiece 1 includes the motor unit 100. However, the present invention is not limited thereto. A configuration may be adopted in which the stepping motor and the train wheel are directly disposed in the main plate of the timepiece without being disposed in the support body.

In addition, the configuration elements in the above-described embodiment can be appropriately substituted with well-known configuration elements within the scope not departing from the spirit of the present invention.

What is claimed is:

1. A timepiece comprising:
    a voltage detection unit that detects a voltage applied to a stepping motor for driving an indicating hand, and that outputs a voltage detection result; and
    a first control unit that controls a rotor to perform reverse rotation by using a reverse rotation pulse including a first pulse whose polarity is the same as that of a normal rotation pulse for causing the rotor of the stepping motor to perform normal rotation, a second pulse whose polarity is reverse to that of the first pulse, and a third pulse whose polarity is reverse to that of the second pulse, and that controls the rotor to perform the reverse rotation by using the third pulse having a pulse width set in accordance with the voltage detection result.

2. The timepiece according to claim 1, further comprising:
a storage unit that stores a correspondence between a plurality of third pulse ranks relating to the pulse width of the third pulse and the voltage of the voltage detection result; and
a second control unit that instructs the first control unit to cause the rotor to perform the reverse rotation by using the third pulse having the pulse width set based on the correspondence between the third pulse rank and the voltage of the voltage detection result, in accordance with the voltage detection result.

3. The timepiece according to claim 2,
wherein the timepiece is formed so that two or more types of power sources having different voltage regions of an output voltage are mountable thereon, and
wherein the storage unit stores the correspondence between the third pulse rank including a voltage width wider than a variation width of the output voltage of each of the two or more types of power sources and the voltage of the voltage detection result.

4. The timepiece according to claim 2,
wherein the correspondence between the third pulse rank and the voltage of the voltage detection result is set so that the pulse width of the third pulse decreases as the voltage of the voltage detection result is higher.

5. The timepiece according to claim 2,
wherein the storage unit further stores the correspondence between a plurality of first pulse ranks relating to the pulse width of the first pulse and the voltage of the voltage detection result, and
wherein the second control unit instructs the first control unit to cause the rotor to perform the reverse rotation by using the third pulse having the pulse width set based on the correspondence between the first pulse rank and the voltage of the voltage detection result in accordance with voltage detection result, and the first pulse having the pulse width set in accordance with the voltage detection result.

6. The timepiece according to claim 5,
wherein the correspondence between the third pulse rank and the voltage of the voltage detection result is set so that the pulse width of the third pulse decreases as the voltage of the voltage detection result is higher, and
wherein the correspondence between the first pulse rank and the voltage of the voltage detection result is set so that the pulse width of the first pulse decreases as the voltage of the voltage detection result is higher.

7. The timepiece according to claim 2,
wherein the third pulse includes a first half pulse which configures a first half of the third pulse, and
a second half pulse which configures a second half of the third pulse and which is a chopping pulse whose duty ratio is lower than that of the first half pulse.

8. The timepiece according to claim 2, further comprising:
a support body that has the first control unit,
wherein the second control unit is disposed in a separate body from the support body.

9. The timepiece according to claim 1,
wherein before the first pulse is applied to the stepping motor, the first control unit applies a demagnetization pulse whose polarity is the same as that of the first pulse, to the stepping motor.

10. An electronic device comprising:
the timepiece according to claim 1.

11. A control method of a timepiece, comprising:
causing a voltage detection unit to detect a voltage applied to a stepping motor for driving an indicating hand so as to output a voltage detection result; and
causing a first control unit to control a rotor to perform reverse rotation by using a reverse rotation pulse including a first pulse whose polarity is the same as that of a normal rotation pulse for causing the rotor of the stepping motor to perform normal rotation, a second pulse whose polarity is reverse to that of the first pulse, and a third pulse whose polarity is reverse to that of the second pulse, and to control the rotor to perform the reverse rotation by using the third pulse having a pulse width set in accordance with the voltage detection result.

* * * * *